United States Patent
Mulholland

(10) Patent No.: US 8,328,910 B2
(45) Date of Patent: Dec. 11, 2012

(54) METHOD FOR BUILDING REMEDIATION CAUSED BY DEFECTIVE DRYWALL

(76) Inventor: Spiderman Mulholland, Gainesville, FL (US)

(*) Notice: Subject to any disclaimer, the term of this patent is extended or adjusted under 35 U.S.C. 154(b) by 170 days.

(21) Appl. No.: 13/011,450

(22) Filed: Jan. 21, 2011

(65) Prior Publication Data

US 2011/0185900 A1 Aug. 4, 2011

Related U.S. Application Data

(60) Provisional application No. 61/299,629, filed on Jan. 29, 2010.

(51) Int. Cl.
*B01D 53/02* (2006.01)

(52) U.S. Cl. .......... 95/136; 95/92; 95/135; 95/141; 52/741.1

(58) Field of Classification Search .......... 95/92, 135, 95/136, 141; 52/741.1
See application file for complete search history.

(56) References Cited

U.S. PATENT DOCUMENTS

| | | | |
|---|---|---|---|
| 7,758,836 B1* | 7/2010 | Huggins et al. | 423/220 |
| 2008/0193650 A1* | 8/2008 | Lyon | 427/299 |
| 2010/0229497 A1* | 9/2010 | Boisselle et al. | 52/741.3 |
| 2010/0278687 A1* | 11/2010 | Mason | 422/5 |
| 2011/0117001 A1* | 5/2011 | Huggins et al. | 423/244.02 |
| 2011/0171280 A1* | 7/2011 | Toreki et al. | 424/411 |
| 2011/0197640 A1* | 8/2011 | Harman | 71/23 |

* cited by examiner

*Primary Examiner* — Duane Smith
*Assistant Examiner* — Christopher P Jones
(74) *Attorney, Agent, or Firm* — Saliwanchik, Lloyd & Eisenschenk

(57) ABSTRACT

A method of remediating at least a portion of a building that contains defective drywall is presented. The method comprises removal of the defective drywall and cross-contaminated drywall, actively desorbing volatile compounds from the building materials exposed after removal of the drywall and passively desorbing remaining contaminants by depositing a film of an absorbent on the accessible surfaces of the exposed building materials. Active desorbing of volatiles can be carried out with forced thermal desorption, where the interior surfaces of the building are heated while the air is removed and replaced with air free of the volatile compounds. The absorbent for passive desorption can be a nanoparticulate metal oxide.

17 Claims, 3 Drawing Sheets

METHOD FOR BUILDING REMEDIATION CAUSED BY DEFECTIVE DRYWALL

BACKGROUND OF THE INVENTION

From the early to mid 2000s there was a building materials shortage in the US due to a number of reasons. The rebuilding of homes in the aftermath of Hurricane Katrina in August of 2005 added to this already short supply of U.S. building materials. From 2004 through 2007 defective drywall was imported from China into the United States to address this shortage. Since 2006, more than 550 million pounds of drywall have been imported from China; 326.6 million pounds have been imported into Florida. Homeowners in 41 states, the District of Columbia, American Samoa, and Puerto Rico have experienced damage from the contamination from the defective drywall, primarily damage due to sulfur gases emanating from the defective drywall.

Several reports regarding human health issues related to the diffusion of sulfur gases have been issued by individuals and state government. The sulfur gases have lead to corrosion of metals, odor, and other problems within the buildings containing defective drywall. Toxicological testing of these buildings have resulted in multiple conclusions that range from no health problems to serious health issues from prolonged exposure to the sulfur compounds that have been identified. The Consumer Product Safety Commission (CPSC), U.S. Environmental Protection Agency, Centers for Disease Control and Prevention, Agency for Toxic Substances and Disease Registry, and state health departments, continue to investigate this problem. These agencies are working to identify whether the chemicals being emitted from the drywall are of concern and whether homes with the defective drywall pose any health risk to people who live in these homes. It may be several years before we fully understand the long-term health effects, if at all, that are associated with Chinese or other defective drywall cases.

Laboratory analysis conducted at the request of the Defective Drywall in America (DDIA) workgroup has confirmed the diffusion of multiple sulfur containing gases from the defective drywall. Laboratory analysis and field study tests have found high levels of strontium in defective drywall manufactured in China relative to that found in typical drywall manufactured domestically. DDIA, through laboratory analysis, confirmed in October of 2009 that bacteria is present in the defective drywall and that the bacteria may be a significant contributing factor for the presence of the gases that diffuse from the defective drywall that were causing damage to interior components of homes and buildings. The occurrence of the bacteria also presents serious health concerns and reports were sent from DDIA to local, state, and federal governmental agencies for their review. Ongoing analysis of multiple Chinese and domestic drywall sources continues to determine if all Chinese drywall is defective and display compositions that may be responsible for the sulfur gases.

There is a growing concern over the means and methods for remediation of the buildings that have been contaminated due to defective drywall. Although there are more protocols being introduced, no method has been certified as effective by state or federal government. With no clear standard or guidelines, DDIA and the Building Envelope Science Institute embarked on a mission to determine a safe, cost effective, and scientifically sound process that can be implemented with sufficient controls that a meaningful certification can be given to builders, homeowners, and other owners whose building has been remediated from the problems arising from defective drywall.

BRIEF SUMMARY OF THE INVENTION

An embodiment of the invention is directed to a method of remediation of a building that has been contaminated due to the presence of defective drywall. The method involves the removal of the defective drywall and any drywall in the vicinity of the defective drywall, an active physical desorption by degassing with air exchange which can involve use of physical absorbents or chemical absorbers or removal agents that are solids, liquids and/or gases. These agents include those for reactive gas decomposition (RGD), such as hydroxyl radical treatment or equivalent gas phase disinfection procedure of noxious compounds, bacteria, viruses and/or fungi absorbed in building materials that were contacting or otherwise in communication with the defective drywall. Remediation includes passive desorption from the contaminated building materials into a film deposited on the building materials, which may include furnishings and other articles present in the building prior to defective drywall removal. After this remediation, damaged wiring, insulation, air conditioning ducts and other structures can be replaced prior to completion of the remediation by instillation of non-defective drywall. The remediation can then be inspected and certified. By placing accessible absorbing cartridges in the buildings heating, ventilating, and air conditioning (HVAC) units, the indoor air quality can be monitored over a standard protocol to assess the success of the remediation over time.

DETAILED DESCRIPTION OF THE INVENTION

Figure 1:
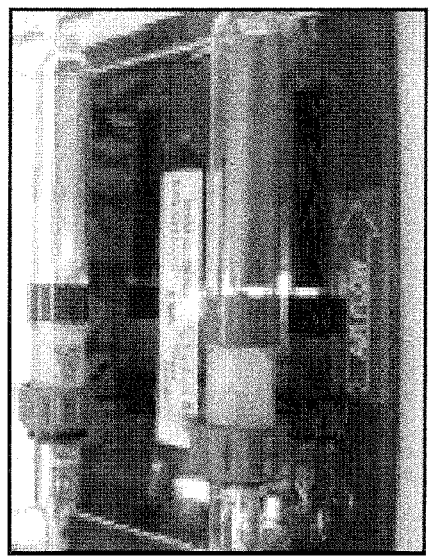
FIG. 1 shows photographs of a Humidified Air Delivery System (HADS), a pair of Volatile Source Chambers (VSCs) and a pair of volatile corrosion chambers (VCCs) used for testing defective drywall.
Figure 1:
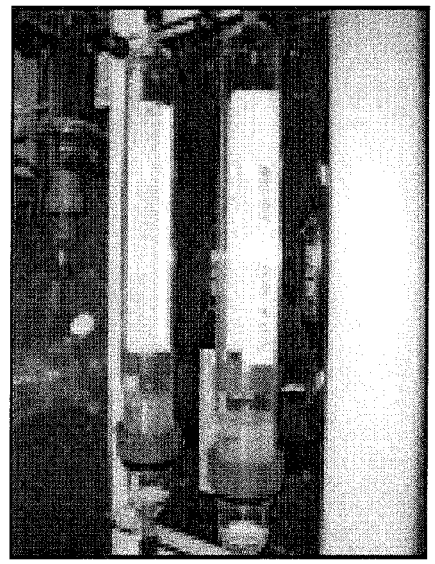
Figure 1:
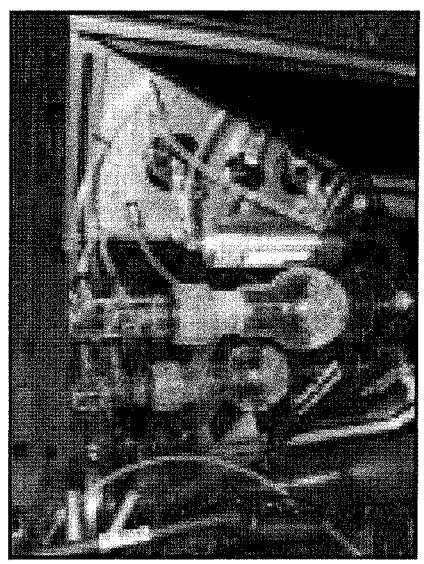
Figure 2:
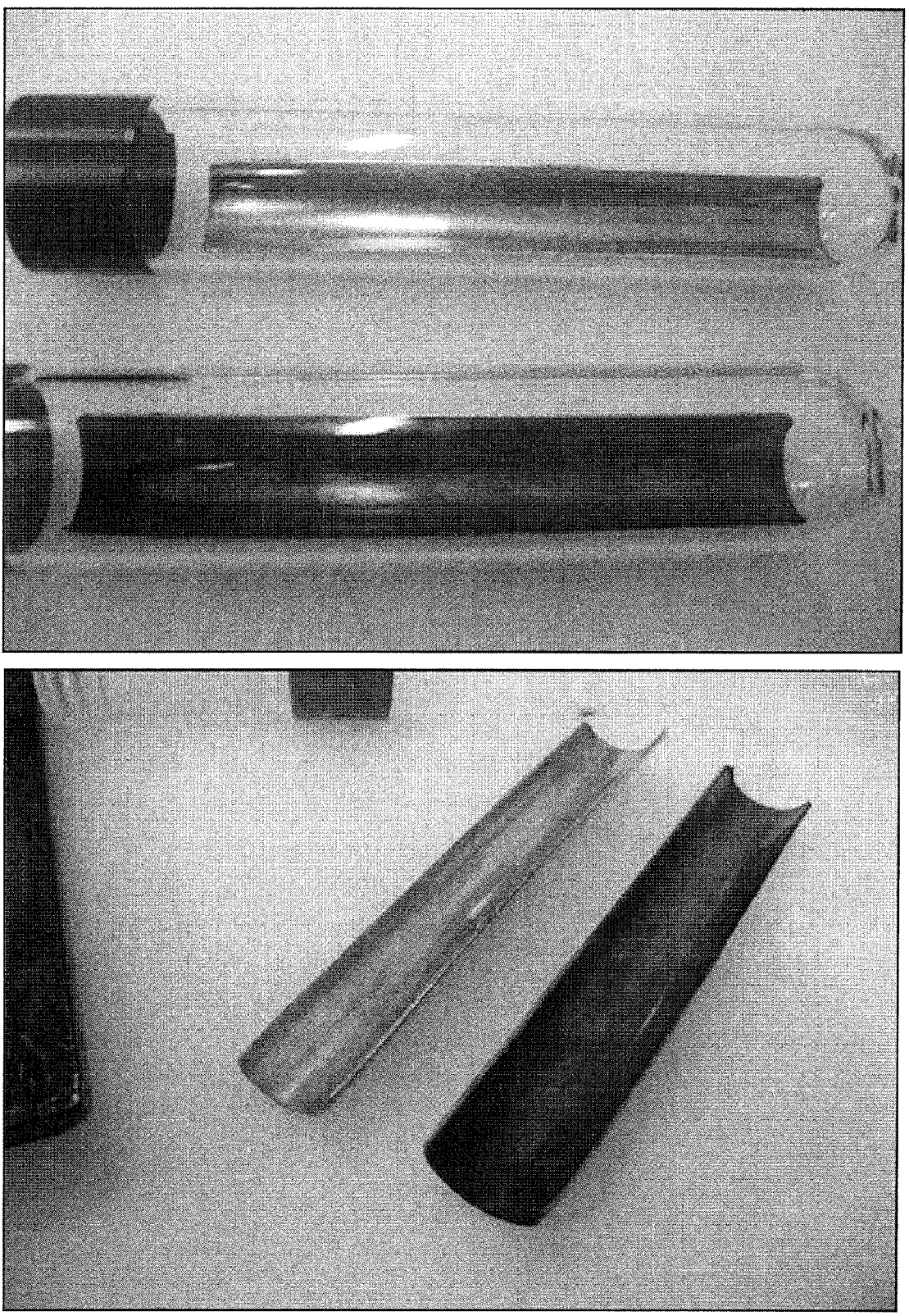
FIG. 2 shows photographs of (left) a pair of VCCs at the end of the test showing little or no corrosion for a copper test strip exposed to U.S. drywall and a heavily corroded copper test strip exposed to Chinese drywall and (right) the copper test strips after removal from the VCCs.

Embodiments of the invention are directed to a method for remediation of a structure that includes defective drywall. The entire structure or a portion of the structure, for example, a single room, may require remediation. The defective drywall is any gypsum comprising sheet product that contains any absorbed or actively generating source of noxious sulfur comprising compounds, such as is common to much drywall imported from China during the time period of about 2004 through about 2007, but not limited by the time period. The defective drywall may include a known or unknown generator of the noxious sulfur comprising compounds; for example an enzyme from active or inactive bacteria, fungi or other biological contaminates; inorganic catalytic species; or organic catalytic species. The defective drywalls for purposes of the invention are those that upon inspection contain or emit hydrogen sulfide or other sulfur comprising compounds identified by analysis of the drywall or the environment in the proximity of the drywall. The analysis can be done using sophisticated analytical laboratory procedures, onsite analytical procedures, or even relatively unsophisticated observation such as the detection of a "rotten egg" odor in a room finished with defective drywall or the observation of blackened, corroded, metallic surfaces in the room or in a volume in the wall behind the defective drywall. It is generally recommended that reliable analysis in a certified laboratory of samples collected in the vicinity of the suspected defective drywall be carried out prior to the more costly remediation process. It is recommended that documentation be generated and maintained throughout the discernment of the need for remediation and throughout the process of remediation.

The remediation process involves a step of removing the defective drywall and any contaminated drywall in the vicinity of the defective drywall; due to cross-contamination, all drywall is removed and replaced with non-destructive drywall. The removal step, as well as all additional steps, should be conducted by a trained technician that has taken appropriate safety precautions and disposes of the defective drywall in appropriate approved sites. Appropriate precautions include:

1) Compliance with applicable safety and health regulations that may include: OSHA General Duty Clause (29 CFR 1910); Emergency Action and Fire Prevention Plans (29CFR 1926:20; 1910, 38-39); Personal Protective Equipment (29CFR 1926.95: 1910.132); Respiration Protection (29CFR 1910.134); Heat Disorders and Health Effects (OSHA Technical Manual TED1-0.15A, Sect. 111, Chapter 4); Confined Spaces (29 CFR 1926.21; 1910.146); Hazard Communication Standards (29 CFR 1910.1200); Lockout/Tag-out Procedures and Electrical Safety Orders (29 CFR 1910.147); and Fall Protection (29 CFR 1926.500).

2) Wearing of Personal Protection Equipment (PPE) including appropriate disposable coveralls including shoe covers, hard hats, goggles, respirators (in the manner prescribed by Occupational Safety and Health Administration Standard 29, Code of the Federal Regulation 1910.134), gloves, and work boots.

3) Construction of isolation barriers, as needed, to segregate portions of a structure constructed with defective drywall.

4) Use of an active filtering air exchange device (AFD) employing an air filter, for example an air exhaust or circulating system with a HEPA filter to remove approximately 99% or more of airborne particulates with the exchange of a minimum of about four to about six times the volume of the isolated air volume per hour, where the appropriateness and the need for the pressure differential is determined by the trained technician. HEPA is an acronym for "high efficiency particulate air/resistance," which describes an air filter which removes 99.97 of particles of 0.3 microns or greater in diameter.

5) Use of a HEPA Vacuum as needed to remove relatively high concentration of particulate and small debris from the air and from floors and other surfaces.

Before the removal of the defective drywall, the trained technicians should: remove all non-attached items (furniture, dishes, clothes, pictures, etc.); protect all floors that will remain (it is recommended that any carpet and its padding be removed and discarded); and remove all trim, doors, door handles, casings, electrical covers, attached mirrors, built in cabinets, shower/tub enclosures, plumbing fixtures, HVAC covers, and electrical fixtures (where upon inspection, and based on the materials of construction, these removed items be either cleaned and/or refurbished for subsequent reinstatement after completion of remediation or discarded and replaced)

Removal of the defective drywall and contaminated drywall is most easily and safely performed by taking as large a section as possible. The removed sections should be transported to a dumpster or other temporary receptacle in a manner that minimizes any contamination of any non-contaminated, decontaminated, or materials storage area as possible. Ultimately, disposing of the defective drywall and other contaminated materials should be in accordance with all regulations of the United States, any state, and community in which the building under remediation resides. Completion of the defective drywall removal step generally includes removal of all generated dust and debris from all exposed surfaces. Cleaning, for example, can involve vacuuming with a HEPA vacuum and/or washing or wiping the contaminated rooms by appropriate means from the top down towards an AFD used within the room. Generally, hand washing is appropriate and pressure washing should be avoided. Air cleaning by use of pressurized air from a cylinder, a blower or an air compressor is discouraged. Once a thorough first cleaning of the contaminated space has been completed, air scrubbing by the AFD should be carried out for a sufficient period of time, for example, twenty-four hours.

After removal of the defective and contaminated drywall, all exposed electrical wiring, including low voltage wiring, is removed and replaced. Wiring that was exposed to airborne sulfur comprising compounds off-gassed by the defective drywall may be sufficiently damaged to jeopardize the structure, even after other remediation steps are completed. Therefore, the suggested standard is to remove all wiring from the site of the device to be powered to the service box. All interior HVAC units, duct work and attachments from the home should be removed and replaced. All sheet insulation from stud walls and attic areas should be removed and replaced. Foil insulation on CMU block, or other concrete wall surfaces should be removed and the exposed surface treated with an absorbent in the manner described below. For structures having sprayed foam insulation testing for contamination is suggested to determine the need for removal.

According to an embodiment, subsequent to removal of the defective and contaminated drywall, the process for remediation involves actively desorbing contaminates from the surfaces exposed upon removal of the drywall. Actively desorbing involve imposing an air flow and can include a forced thermal desorption (FTD), where the sulfur comprising compounds and any other absorbed airborne contaminates, for example volatile organic compounds, from contacting surfaces, or more remote surface that were in communication with the airborne contaminates from the defective drywall, are desorbed from the exposed surfaces. The thermal desorption results from the heating of the contaminated space, such that the shell of the structure to a temperature of, for example, approximately 110° F. to 120° F. or more. The heat can be generated from any heating device of sufficient capacity used under safe conditions. The heating device can be an electric resistive heating device or one where the heat by any safe source, including a fuel driven flame under controlled conditions. The heating device can be controlled manually or automatically. Temperatures can be measured, displayed, and recorded by any known means, including thermometers, thermisters or infrared measuring devices and can provide a control signal to a processor or other device to control the heater. This heating is carried out in a manner where the structure's shell temperature is maintained between a minimum and maximum prescribed temperatures and duration, for example a minimum of 8 hours per day for three days.

In one embodiment, over the duration of the FTD step, one or more air removal devices should be employed such that a pressure differential is generated between the space being decontaminated and the exterior of the structure, for example a pressure differential of more than 75 Pa, for example 75 to 100 Pa, is imposed upon the portion of the structure being desorbed. Multiple air scrubbers vented to the outside are often needed to create the desired pressure differential. Failure to achieve a sufficient pressure differential may allow re-absorption of the desorbed gases into the building materials, including wood studs, concrete, and masonry block. The FTD step is carefully and continuously monitored. For assurance of sufficient desorption, the FTD time and the temperature within the decontaminated space is recorded. Even when heaters are shut down, for example at night, the negative pressure differential should be maintained throughout the FTD step of the process. Achieving and maintaining the minimum pressure differential may require closure or covering of soffit vents, fireplace flue openings, bathroom vents, ridge vents and other openings from the portion of the building. Air leakage into the building provides uncontaminated air to replace the contaminated air being removed. The air exit of the air removal devices, such as scrubbers, should be positioned such that the entering replacement air is not drawn from a device's exhaust.

In another embodiment, desorbing can be carried out with or without FTD where the air of the contaminated structure can be circulated through an air circulating device that contains one or more chemical absorbents, for example hydroxyl radicals or a fluid oxidant, and/or one or more physical absorbents for the sulfur comprising compounds and/or other airborne contaminates, for example volatile organic compounds. The chemical absorbent can be a gas, liquid or solid, where a reactive chemical can be one, for example, where the sulfur comprising compound, can be oxidized into a non-volatile species, for example in a Stretford, Ferrox, or Ventrocoke regenerative absorption system for $H_2S$. For purposes of the invention, absorbents employed during desorbing include any agent that removes sulfur comprising compounds and other airborne contaminates from the air, including those which produce a non-physically or chemically absorbed reaction product. Systems for absorption can employ solid physical or chemical absorbents, such as reactive metals, zeolites, and metal oxides, liquid phase oxidants, such as hypochlorous acid solutions, sodium hypochlorite solutions, or hydrogen peroxide/acetic acid solutions, and/or gas phase oxidants, such as hydroxyl radicals or ozone. Solid absorbents can have a high surface area, for example aggregates of particulates, such as metal oxide powders, or a rolled continuous sheet, for example a rolled metal foil. The air exiting the air circulating device is depleted of the contaminating sulfur comprising compounds and/or other volatile organic compounds. The circulating device can include a filter, an additional liquid or solid absorber, and/or a condenser to prevent introduction of the resulting reaction product into the air volume of the structure being decontaminated.

According to embodiments of the invention, subsequent to desorbing, particularly where there is evidence of biological contamination to the defective drywall, the surface can be cleaned or sprayed with an antibacterial and/or antifungal agent, where such agents are commercially available or readily prepared as can be appreciated by those skilled in the art, but include hypochlorous acid solutions, bleaches, and tetraalkylammonium salt comprising solutions. After desorbing, the contaminated surfaces can be treated by contacting the contaminated surface with a second absorbent in a passive desorption step. For the purposes of the invention, passive desorption means that no imposed air flow or exchange is necessary to drive desorption. The absorbent can be dusted, sprayed or otherwise deposited as a powder, suspension in a solvent, or as a solution upon the contaminated surfaces. The absorbent can be any species that chemically reacts, chemically catalyzes a destructive conversion of the sulfur comprising compounds or other contaminating compounds or species, chemically absorbs, or physically absorbs in an essentially irreversible fashion. In general, removal of the deposited chemical absorbent is not intended to be carried out before the attachment of new drywall. Deposition may be carried out after completion of any rewiring, reinsulating or other reconstructing necessary for completion of the remediation, although the trained technician can complete any or all appropriate rewiring, reinsulating or other reconstructing after deposition as is determined to be appropriate. It is suggested that any non-absorbent surfaces that are not in need of treatment, which may include glass, metal, and ceramic surfaces, particularly those to be exposed after completion of the remediation and restoration, be covered with plastic or other coverings that allow isolation of the surfaces from a coating of the chemical absorbent. In an embodiment of the invention, the absorbent is a nanoparticulate metal oxide, for example a nanoparticulate titanium oxide or magnesium oxide. Nanoparticles provide an extremely large surface area per mass of absorbent. The nanoparticles can be agglomerated into microparticles. The nanoparticles can be 20 to 1,000 nm in cross-section and can be of any geometry. For example, the ChemKlenz-C3D System or OdorKlenz by the NanoScale Corporation can be used to chemical desorb and decontaminate the contaminated surfaces, including textile surfaces, such as that of furniture removed from the site prior to removal of the defective drywall. All surfaces that had been in contact with drywall in the home must be sprayed and completely covered with the particulate absorbent surface treatment. The particulate absorbent surface treatment can be applied by a trained technician while using a NIOSH approved N95 mask for protection from particulate inhalation. The deposited particulate absorbent, for example, ChemKlenz-C3D, surface coating can dry to leave a white powder residual, allowing for inspection and assurance of adequate coverage. Surfaces such as metal studs do not need to be sprayed. Generally, attic rafters do not need to be chemically desorbed but ceiling rafters that supported defective drywall requires this passive desorption.

Appropriate inspections, documentation and reconstruction is carried out after completion of the remediation process comprising the removal step, FTD step or air circulation through a device comprising a chemical or physical absorbent, and the chemical desorption step.

MATERIALS AND METHODS

Using the equipment shown in FIG. 1, a 3 week (24 hrs per day for 21 days) exposure test was performed. High pressure compressed air at 150 psi was supplied from a laboratory air compressor system to a Humidified Air Delivery System (HADS). The HADS outlet pressure was set at 15 psig where the gas passes through humidifying bubblers filled with distilled or de-ionized water. An outlet air flow rate was set at 1 liter per minute (1 LPM) for each of two outputs that supplied the humidified air to two Volatile Source Chambers (VSCs), separately containing equal sized pieces of a Chinese Drywall sample removed from a private residence (USBCI, Sample ID# DD-ER May 29, 2009) and an American Drywall sample produced by US Gypsum (USBCI, Sample ID# USG-02 Jun. 18, 2009). The air output from the individual VSCs were directed to separate Volatile Corrosion Chambers (VCCs) that contained identical copper metal test strips. The copper metal strips were ¾"×4" pieces of industry standard HVAC A/C ¾" soft copper tubing (IUSA ¾" soft refrigeration tubing) that were sectioned in half from the same tube with each piece identically rinsed with methanol and wiped clean of any oils. The humidity and temperature of the air stream exiting the HADS was constantly measured using a digital thermo-hygrometer (OMEGA P/N# HH314A) and was maintained at 75.5±1.0° F. and 94%±5% RH throughout 3 weeks. The total air volume passed over the samples and through the chambers during the experiment was 30,240 Liters. After 3 weeks of air exposure, the Chinese Drywall exposed sample showed significant black discoloring while the USA Drywall exposed sample maintaining its original copper color and luster. Subsequent scanning electron microscopy (SEM) with Elemental Energy Dispersive Spectroscopy (EDS) testing was performed on the two copper samples by the Major Analytical Instrument Center (MAIC) of the Department of Material Science & Engineering (MSE) at the University of Florida (Gainesville, Fla.), which confirmed high sulfur corrosion product on the Chinese drywall exposed copper sample.

Figure 3:
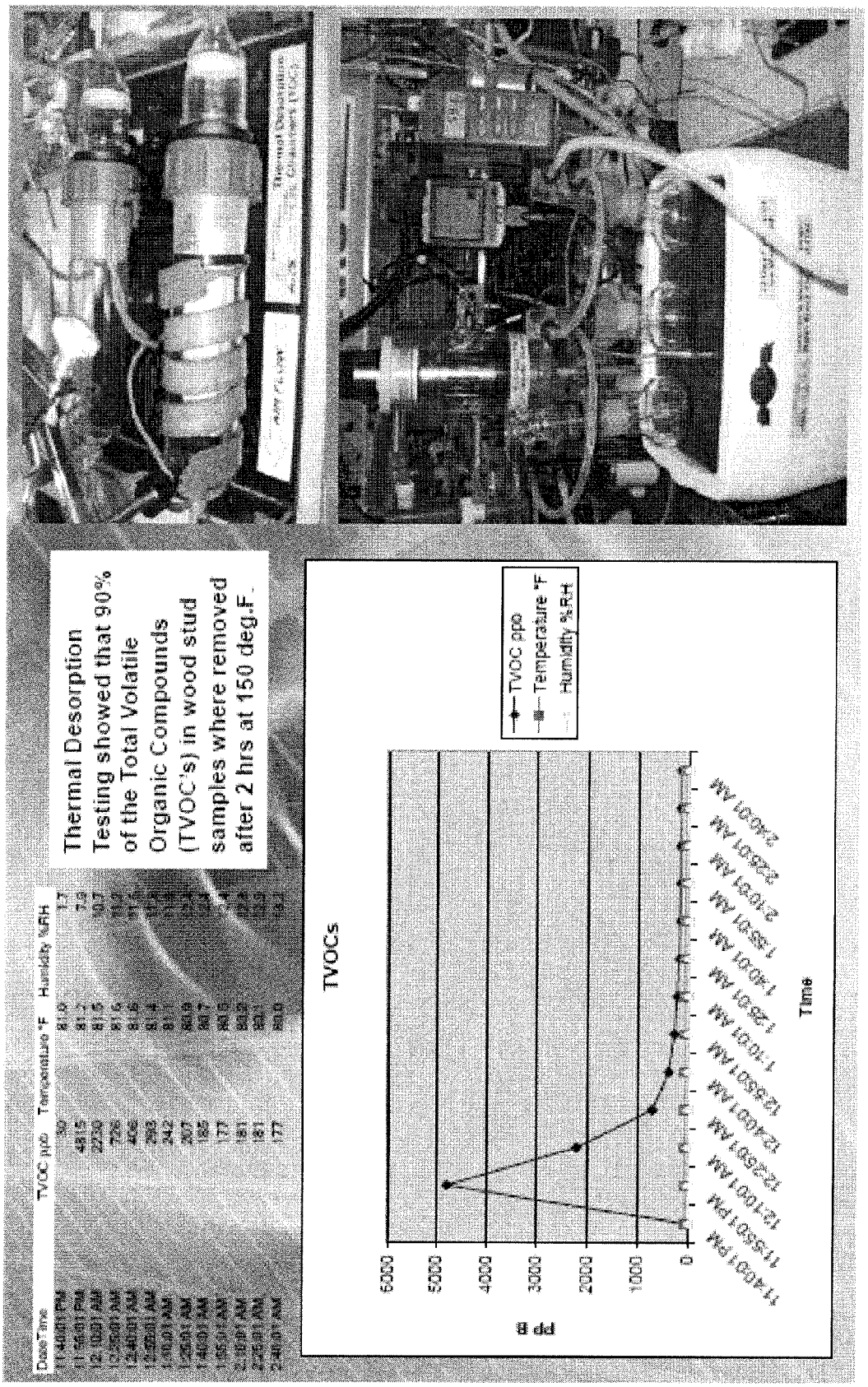
FIG. 3 shows a photograph of components for the off-gas testing of wood stud samples that were in contact with defective drywall, a table and a plot of the conditions of temperature and humidity and the total volatile organic compounds removed from the samples.

Analytical Research Systems, Inc. (ARS) conducted studies on the diffusion of gases from samples of the wood-frame that were behind defective drywall in a house that was constructed with defective drywall. Thermal Desorption was carried out with the equipment shown in FIG. 3 under the conditions given in the table and plotted with the resulting total volatile organic compounds out-gassed from the samples. Under the conditions given in FIG. 3, more than 90% of all volatiles were out-gassed from the wood samples.

All patents, patent applications, provisional applications, and publications referred to or cited herein, supra or infra, are incorporated by reference in their entirety, including all Figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A method for remediation of defective drywall comprising:
   removing defective drywall from at least a portion of a building;
   actively desorbing sulfur comprising compounds and/or other volatile organic compounds from building materials exposed after removal of the defective drywall using an imposed air flow; and
   passively desorbing remaining contaminants by depositing a film of at least one absorbent on the accessible surfaces of the exposed building materials.

2. The method of claim 1, wherein actively desorbing comprises forced thermal desorption (FTD), from surfaces of the exposed building materials by heating the portion of the building and wherein the imposed air flow comprises removal of at least some of the contaminated air from the portion of the building and replacing the air with air that is free or depleted of the sulfur comprising compound and the other volatile organic compounds.

3. The method of claim 2, wherein the heating heats to a temperature of 110° F. to 120° F.

4. The method or claim 2, wherein removal of the air comprises employing at least one scrubber and/or other air removal device to achieve a pressure differential between the portion of a building and the exterior of the building and replacing comprises permitting entrance of the replacing air from the exterior of the building at one or more sites remote from the scrubber's or other air removal device's exhaust.

5. The method or claim 4, wherein the pressure differential is 75 Pa or greater.

6. The method of claim 2, wherein removal and replacing of the air comprises circulating the air through one or more devices comprising at least one second absorbent, wherein the air from the portion of the building enters the device and the air exiting the device is depleted of the sulfur comprising compound and/or other volatile organic compounds.

7. The method of claim 6, wherein the volume of air per hour exiting the devices is at least four times the volume of the portion of the building.

8. The method of claim 6, wherein the second absorbent comprises one or more solid particulate chemical and/or physical absorbents.

9. The method of claim 6, wherein the second absorbent comprises a reactive fluid.

10. The method of claim 9, wherein the reactive fluid comprises a gas comprising hydroxyl radicals.

11. The method of claim 1, wherein actively desorbing comprises circulating the air through one or more devices comprising at least one second absorbent, wherein the air from the portion of the building enters the device and the air exiting the device is depleted of the sulfur comprising compound and/or other volatile organic compounds.

12. The method of claim 11, wherein the second absorbent comprises one or more solid particulate chemical and/or physical absorbents.

13. The method of claim 11, wherein the second absorbent comprises a reactive fluid.

14. The method of claim 13, wherein the reactive fluid comprises a gas comprising hydroxyl radicals.

15. The method of claim 1, wherein depositing the film comprises dusting a powder or spraying the absorbent in the form of a suspension in a solvent or as a solution.

16. The method of claim 15, wherein the absorbent comprises a nanoparticulate metal oxide.

17. The method of claim 16, wherein the nanoparticulate metal oxide comprises titanium dioxide or magnesium dioxide.

* * * * *